(12) United States Patent
Greene

(10) Patent No.: US 6,920,428 B2
(45) Date of Patent: Jul. 19, 2005

(54) METHOD OF SELLING AND DISTRIBUTING ARTICLES ASSOCIATED WITH LIVE EVENTS

(75) Inventor: Shawn Buchanan Greene, St. Louis, MO (US)

(73) Assignee: The Friday Group LLC, St. Louis, MO (US)

( * ) Notice: Subject to any disclaimer, the term of this patent is extended or adjusted under 35 U.S.C. 154(b) by 207 days.

(21) Appl. No.: 09/992,811

(22) Filed: Nov. 19, 2001

(65) Prior Publication Data

US 2003/0097307 A1 May 22, 2003

(51) Int. Cl.$^7$ ............................................. G06F 17/60
(52) U.S. Cl. ........................................ 705/16; 705/26
(58) Field of Search .................................... 705/26, 16

(56) References Cited

U.S. PATENT DOCUMENTS

| | | | |
|---|---|---|---|
| 5,613,032 A | * 3/1997 | Cruz et al. | ............ 386/69 |
| 5,638,113 A | * 6/1997 | Lappington et al. | ........ 348/12 |
| 5,945,653 A | * 8/1999 | Walker et al. | ........... 235/380 |
| 6,101,485 A | 8/2000 | Fortenberry et al. | |
| 6,131,086 A | 10/2000 | Walker et al. | |
| 6,233,682 B1 | 5/2001 | Fritsch | |
| 6,240,396 B1 | 5/2001 | Walker et al. | |
| 6,614,729 B2 | * 9/2003 | Griner et al. | ........... 369/1 |
| 2002/0051407 A1 | * 5/2002 | Griner et al. | ........... 369/1 |
| 2002/0199198 A1 | * 12/2002 | Stonedahl | ............ 725/86 |

OTHER PUBLICATIONS

U.S. Appl. No. 60/235,517, dated Sep. 26, 2000.*

* cited by examiner

*Primary Examiner*—Michael Cuff
(74) *Attorney, Agent, or Firm*—Thompson Coburn LLP

(57) ABSTRACT

A method comprises the steps of: providing an opportunity for prospective event ticket purchasers to pre-purchase one or more copies of a recording of at least a portion of a live event; conducting said live event; recording at least a portion of said live event; determining a number of copies of said recording pre-purchased; calculating a desirable number of copies of said recording to be manufactured; manufacturing said desirable number of copies of said recording; and distributing at least some of the manufactured copies of said recording to those that pre-purchased them. The opportunity for pre-purchasing copies of the recording occurs at a point of sale of tickets for the live event to be recorded before the live event occurs.

30 Claims, 7 Drawing Sheets

FIG. 4

METHOD OF SELLING AND DISTRIBUTING ARTICLES ASSOCIATED WITH LIVE EVENTS

BACKGROUND OF THE INVENTION

The present invention relates to the sale and distribution of articles associated with live events. More particularly, the present invention relates to a method of selling recordings of a live event and other event-specific articles at a point of sale of tickets for the live event before the live event has taken place or before another specified cut-off date. The present invention also relates to a method of licensing live event ticket purchasers to make their own recordings of the live event they attend.

According to statistics published by the Recording Industry Association of America, approximately 62 million people attended approximately 27,000 live events around the world. Such events included live musical performances (e.g., concerts, operas, etc.), live choreographic performances and live dramatic performances (e.g., plays, theater, etc.). Millions more attend live events comprising live orations (e.g., motivational speakers, evangelical speakers, educational speakers, etc.), live sporting events, and other live events. Statistics published by the Recording Industry Association of America also indicate that, U.S. sales of recorded music alone in the year 2000 amounted to approximately $14.3 billion, and sales of recorded music globally amounted to approximately $38.5 billion in 2000. It is evident from these statistics that the live event and recording industries are significant segments of our domestic and global economies involving a large percentage of our population.

Millions of copies of recordings of live events (e.g., live concert albums; video recordings of concerts and theatrical performances; audio recordings, video recordings and printed transcripts from live orations, etc.) are sold each year. However, conventionally, such copies are not sold or even offered for sale until well after the live event has been conducted and recorded. Thus, it is often difficult for recording companies to accurately gauge an appropriate level of production relative to predicted demand.

According to more statistics published by the Recording Industry Association of America, the average wholesale distribution price of a compact disc (CD) in the year 2000 was $9.95 per unit, and the average retail price per unit was approximately $12.75. Of the $9.95 per unit wholesale distribution price, the record company makes an average of approximately $8.00 and the artist makes an average of approximately $1.95. Even more significant is the amount of money spent in marketing and promoting new releases.

Unfortunately for the record companies and artists, less than 10% of new releases are profitable, according to Recording Industry Association of America statistics. This low percentage of success is largely due to the aforementioned fact that recording companies often have difficulty accurately gauging an appropriate level of production relative to predicted demand for a particular release. Thus, there is a need for a convenient mechanism for recording companies and artists to predict demand for a particular recording of a live event, before the costs of conducting the live event, recording the live event, producing copies of the recording, and marketing and promoting the release have been incurred, in order to gauge a desirable number of copies of the live event recordings (or other event-specific merchandise) to be produced, thereby increasing the likelihood of profitability.

To increase the likelihood of profitability in selling their live event recordings and other event-specific merchandise, recording companies and artists endeavor to find venues that are most likely to cover their target demographic. For live concert albums, and other audio and video recordings of concerts and theatrical performances, perhaps the most common point-of-sale has been record stores, book stores and, more recently, on-line retailers of records and other recordings, such as Amazon.com. While record stores and other traditional retail establishments are logical points-of-sale in which to sell live event recordings, recording companies and artists have not taken full advantage of the live events themselves (which, again, attract approximately 62 million people annually) as points-of-sale.

People attend music concerts, theatrical performances and other live events for many obvious reasons. One of these reasons is that the attendees, in many cases, are amongst the most fervent supporters or "fans" of the artists or other performers that are performing. These live event attendees are in fact the target audience. Until now, recording companies and artists have failed to take full advantage of the fact that their target audience is already captured at these live events. These attendees or "fans" are typically at their most frenzied point of anticipation when buying tickets for the live events they plan to attend. Depending on the venue and performer, music concertgoers often pay upwards of $60 to $120 for a single concert ticket. At the events themselves, elated fans happily pay $15 for coffee mugs, $35 for concert-related T-shirts, and $25 for official concert programs. Thus, recording companies and artists could benefit from a system that takes advantage of the enthusiasm of prospective live event ticket purchasers, at the pinnacle of their purchasing frenzy, by providing them with a convenient opportunity to purchase copies of a recording of the live event (or other event-specific merchandise) at the point-of-sale of tickets for the live event, either before the live event has taken place or before some other specified cut-off date. Moreover, the opportunity to pre-purchase recordings may, in turn, generate more interest in the live event itself.

Such a system would not only provide recording companies, artists and other rights holders with a mechanism for obtaining additional revenue from live events they conduct, but would also help to curb the unauthorized recording of live events (i.e., "bootlegging") by event attendees, because such attendees would be given an opportunity to purchase a professional recording (or a professionally produced, post-event re-broadcast) of the live event they will attend. Prior to the advent of the Internet and the proliferation of hand-held digital recording equipment, the recording industry had the luxury of substantially controlling the production and distribution of live event recordings. However, technology has now advanced to a level where individuals can record live events on their own, edit the recordings with the assistance of relatively inexpensive computer software, reproduce copies of the recording as electronically transmittable/downloadable files (e.g., MP3, WMA, etc.) or on compact discs with a CD "burner" or similar equipment, and then distribute the copies. With the advent of the Internet, the ability to share and distribute music and other types of live event recordings has become increasingly commonplace. Thus, there is a need for a system that would provide recording companies, artists and other rights holders with an effective mechanism for reducing unauthorized "bootlegging" by event attendees and for obtaining additional revenue in the process.

SUMMARY OF THE INVENTION

It is a general object of the present invention to provide a system for selling and distributing recordings of live events.

A more specific object of the invention is to provide a method of consummating sales and collecting payment for the recordings of the live event to be distributed before the live event has been conducted and recorded or before another specified cut-off date. Another related object of the invention is to provide a method of consummating sales and collecting payment for the recordings of the live event to be distributed at a point-of sale of tickets for the live event to be recorded.

Another general object of the invention is to provide prospective live event ticket purchasers with a convenient mechanism for pre-purchasing recordings of a live event or other event-specific merchandise before the event occurs or before another specified cut-off date, whether or not they will actually attend the live event. Another related object of the invention is to provide recording companies with a convenient mechanism for gauging a desirable number of copies of live event recordings (or other event-specific merchandise) to be produced, before the live event has been conducted. A further object of the invention is to provide artists and rights holders with a mechanism for obtaining additional revenue from live events they conduct. A related object of the invention is to curb the unauthorized recording of live events (i.e., "bootlegging") either by giving the event attendees an opportunity to purchase a professional recording of the live event they will attend or by providing a mechanism for selling licenses to event attendees to make their own recordings of the live events they attend.

In general, a method of the present invention comprises the steps of: providing an opportunity for prospective event ticket purchasers to pre-purchase one or more copies of a recording of at least a portion of a live event; conducting said live event; recording at least a portion of said live event; determining a number of copies of said recording pre-purchased; calculating a desirable number of copies of said recording to be manufactured; manufacturing said desirable number of copies of said recording; and distributing at least some of the manufactured copies of said recording to those that pre-purchased them. The opportunity for pre-purchasing occurs at a point of sale of tickets for the live event to be recorded before the live event occurs.

In another aspect of the invention, a method comprises the steps of: providing an opportunity for prospective event ticket purchasers to purchase one or more copies of a recording of a live event before a specified cut-off date; conducting said live event, recording said live event; determining a number of copies of said recording purchased before said specified cut-off date; calculating a desirable number of copies of said recording to be manufactured based on a function of the determined number of copies purchased before said specified cut-off date; manufacturing said desirable number of copies of said recording; and distributing at least some of the manufactured copies of said recording to those that purchased them before the specified cut-off date. The opportunity to purchase the copies occurs at a point of sale of tickets for the live event to be recorded before the live event occurs.

In still another aspect of the invention, a method comprises the steps of providing an opportunity for ticket purchasers to purchase a license to record a live event, and then conducting the live event. The opportunity to purchase the license occurs at a point of sale of tickets for the live event before the live event occurs.

In yet another aspect of the invention, a method comprises the steps of: providing an opportunity for prospective event ticket purchasers to pre-purchase collector's items pertaining to a live event; determining a number of the collector's items pre-purchased; calculating a desirable number of the collector's items to be manufactured based on a function of the determined number of collector's items pre-purchased; manufacturing the desirable number of collector's items; and distributing at least some of the collector's items manufactured to those that pre-purchased them. The step of providing an opportunity for prospective event purchasers to pre-purchase the collector's items occurs at a point of sale of tickets for the live event before the live event occurs.

In a further embodiment of the invention, a method comprises the steps of: providing an opportunity for prospective event ticket purchasers to pre-purchase a license to view a broadcast of a recording of at least a portion of a live event; conducting the live event; recording at least a portion of the live event; and then broadcasting the recording to those that pre-purchased the license. The step of providing the opportunity to pre-purchase the license occurs at a point of sale of tickets for the live event before the live event occurs.

While the principal advantages and features of the invention have been discussed above, a greater understanding of the invention including a full description of its other advantages and features may be attained by referring to the drawings and the detailed description of the preferred embodiments, which follow.

Reference characters used in these figures correspond to reference characters used in the following detailed description of the preferred embodiments.

DETAILED DESCRIPTION OF THE PREFERRED EMBODIMENTS

Figure 1:
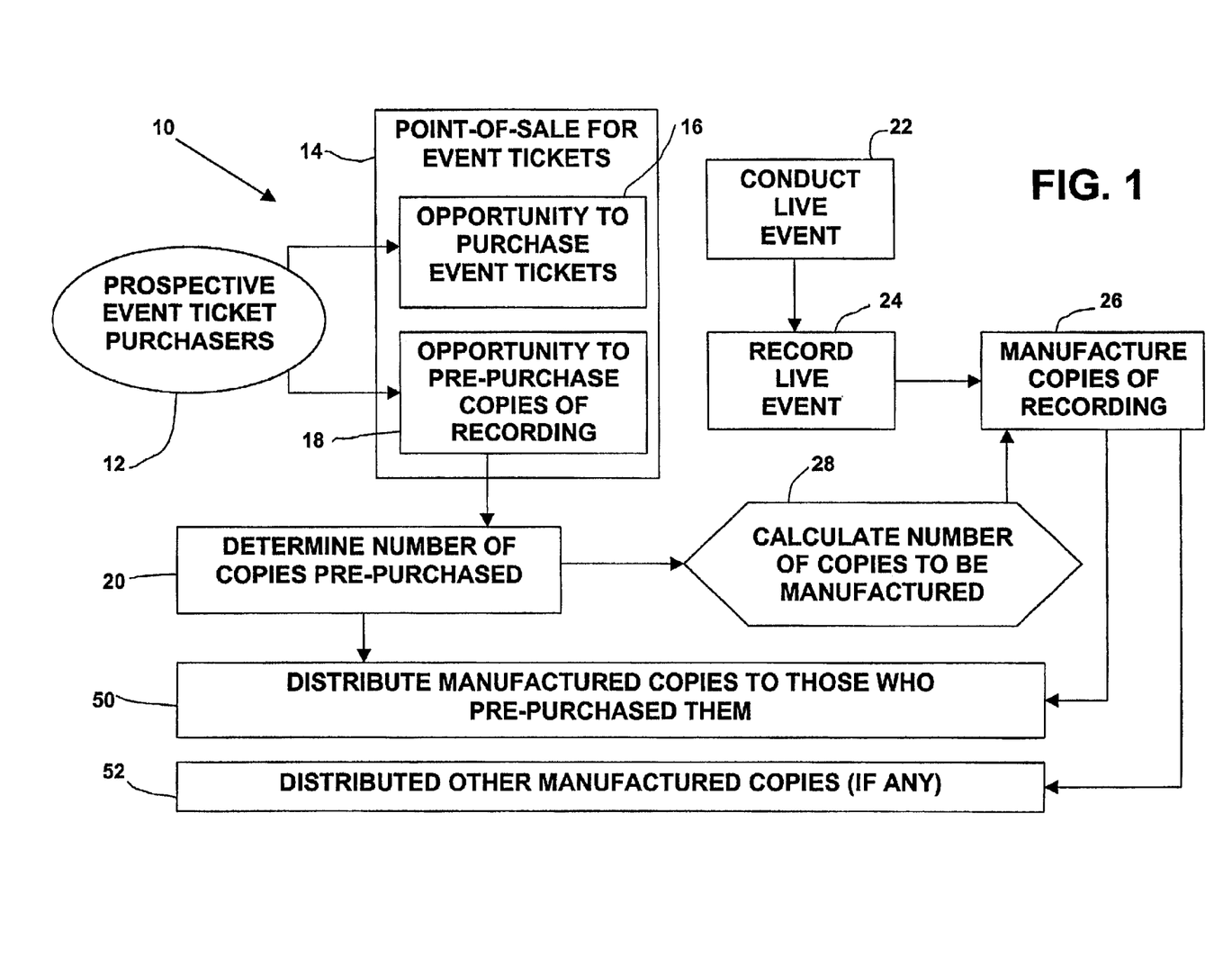
FIG. 1 is a schematic representation of an embodiment of the present invention, which permits prospective live event ticket purchasers to pre-purchase copies of a recording of the live event they will attend.

A first embodiment of a method of the present invention is shown schematically in FIG. 1 and represented generally by the reference numeral 10. In general, the method 10 provides prospective live event ticket purchasers 12 with an opportunity to pre-purchase copies of a recording of the live event they will attend, before the live event has been conducted or recorded or before some other specified cut-off date, as discussed below. As shown in FIG. 1, at a point-of-sale 14 of tickets for a live event, prospective live event ticket purchasers 12 are given an opportunity 16 to purchase tickets to the live event, as is well known in the art. However, unlike the prior art, at the same point-of-sale 14 the prospective live event ticket purchasers 12 are also given an opportunity 18 to pre-purchase copies of a recording of the live event they will attend, before the live event has been conducted and recorded or before some other specified cut-off date.

At the outset, it should be noted that "live event" may be a live musical performance (e.g., musical concert, opera, symphony, recital, etc.), a live choreographic performance (e.g., dance, march, parade, fireworks display, air show, etc.), a live dramatic performance (e.g., operas, plays, theater, etc.), a live oration (e.g., motivational speaker, educational speaker, evangelical speaker, stand-up comedy, sketch comedy, poetry recital, ceremony, etc.), live sporting event (e.g., professional or amateur football, baseball, hockey, basketball, soccer, volleyball, etc.), or some combination thereof. This listing is illustrative, but is certainly not exhaustive. Other live events could be conducted and recorded in association with the present invention without departing from the scope of the present invention.

It should also be noted that the "recording" preferably comprises an audio recording, a video recording, a transcript, or some combination thereof. For example, in the case of a musical concert or other live musical performance, the recording is preferably at least an audio recording, and possibly an audio/visual recording. In the case of a live choreographic performance, the recording is preferably at least a video recording, and possibly an audio/visual recording. In the case of a live oration, the recording may comprise a written transcript of the oration and may also comprise an audio/visual recording. Preferably, the task of recording the live event will be performed by a professional recording company that has been retained for the job by the artist or other holder of rights. In any case, the performance of the step of recording 24 (e.g., filming, video tape recording, digital video recording, photographing, drawing, tape recording, digital audio recording, writing, etc.) is well within the knowledge of one of ordinary skill in the art.

In addition, it should be noted that "copies" of the recording refers to any manner of reproduction of the recording that is suitable for mass production and distribution. For example, in the case of audio recordings, the copies preferably comprise, phonograph records, cassette tapes, compact discs (CDs), mini-discs, digital audio tapes (DATs), and/or electronically downloadable/transmittable digital audio files (e.g., MP3, "wav" digital files, etc.). In the case of video or audio/visual recordings, the copies preferably comprise videocassettes (VHS), digital videodiscs (DVDs), or compact discs (CDs). In the case of transcripts, the copies preferably comprise electronic "soft copy" documents or printed "hard copy" documents. This listing is also illustrative, and is certainly not intended to be exhaustive. Other copy formats now existing (and others not yet contemplated, which will become apparent as technology continues to advance) could be used in connection with the present invention without departing from the scope of the present invention.

With continued reference to FIG. 1, the method 10 further comprises the step of determining a number of copies of said recording pre-purchased 20 at the point-of-sale 14 of tickets for the live event. Apart from the obvious (i.e., counting the number of copies pre-purchased), the manner of determining the number of copies pre-purchased 20 will depend on the nature of the point-of-sale 14, as discussed more fully below. In any case, however, the step of determining the number of copies pre-purchased 20 preferably includes the step of reviewing information about the purchaser (e.g., name, mailing address, shipping address, credit card or other payment information, number and types of copies ordered, etc.) obtained at the point-of-sale 14.

The method 10 illustrated in FIG. 1 also comprises the steps of conducting the live event 22 and recording at least a portion of the live event 24 being conducted. Again, the task of recording the live event is preferably performed by a professional recording company that has been retained for the job by the artist or other holder of rights. After the live event has been recorded 24, a desired number of copies of the recording are manufactured 26. Preferably, the step of manufacturing 26 is performed by a professional production company that has been retained for the job by the artist or other rights holder. The number of copies desired to be manufactured is then calculated 28 based on a function of the determined number of copies 20, as described below.

Figure 2:
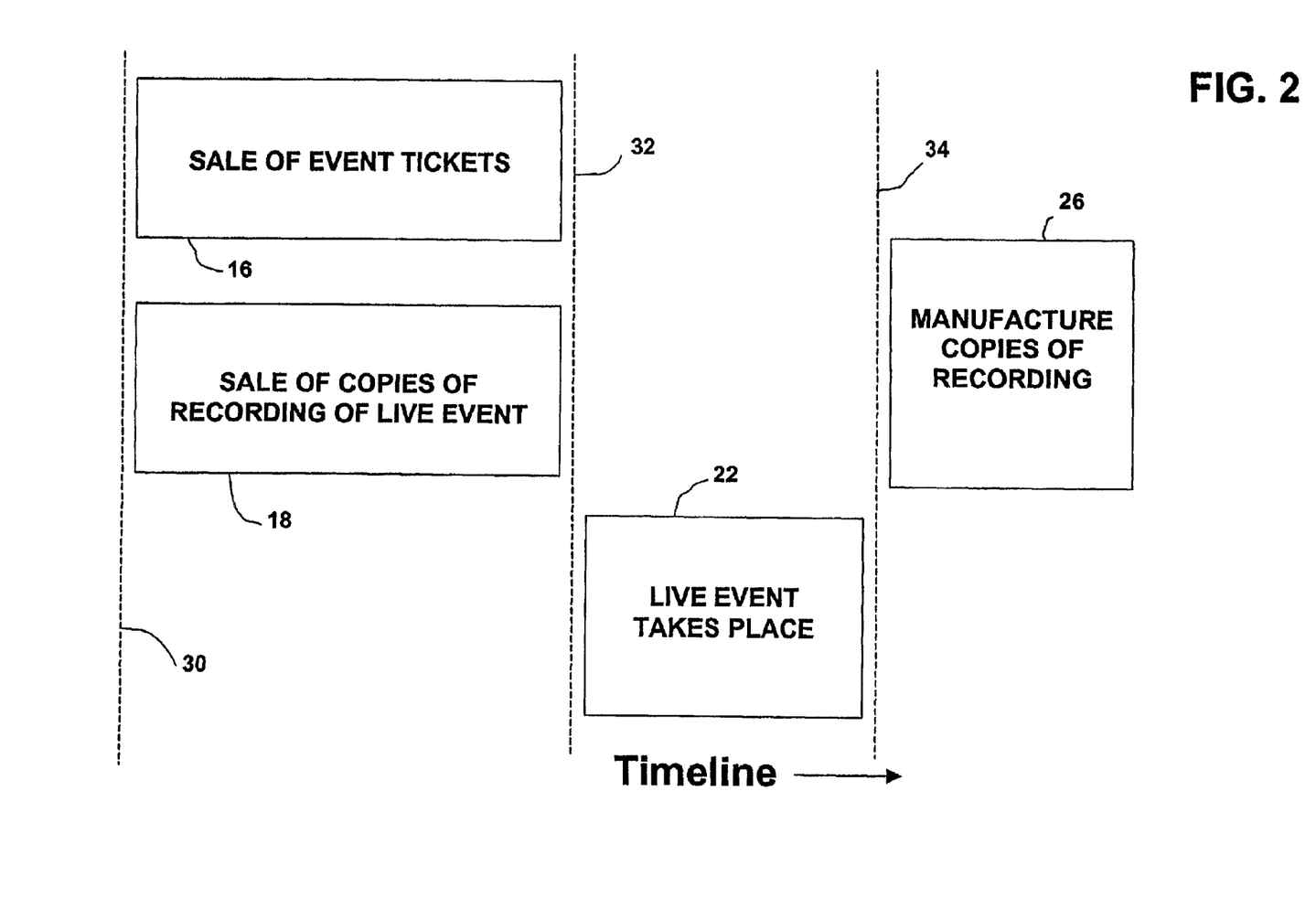
FIG. 2 is a diagram representing a timeline for an embodiment of the invention as shown in FIG. 1, wherein any copies of a recording of the live event must be pre-purchased by prospective live event ticket purchasers before the live event takes place.

Preferably, the opportunity 16 to purchase tickets to the live event and the opportunity 18 to pre-purchase copies of a recording of the live event both occur before the live event is conducted 22 and recorded 24. This preferred sequence is illustrated in FIG. 2, which is a timeline showing the preferred sequence of events. As shown in FIG. 2, the opportunity 16 to purchase tickets to the live event and the opportunity 18 to pre-purchase copies of a recording of the live event both begin at substantially the same time at an initial offering date 30. Preferably, the opportunity 16 to purchase tickets and the opportunity 18 to pre-purchase copies of recordings both terminate at a closing date 32, which is preferably before the live event is conducted 22. FIG. 2 also illustrates that the step of manufacturing copies of the recording 26 does not begin until after a manufacturing date 34, which occurs after the live event 22 has been conducted.

Figure 3:
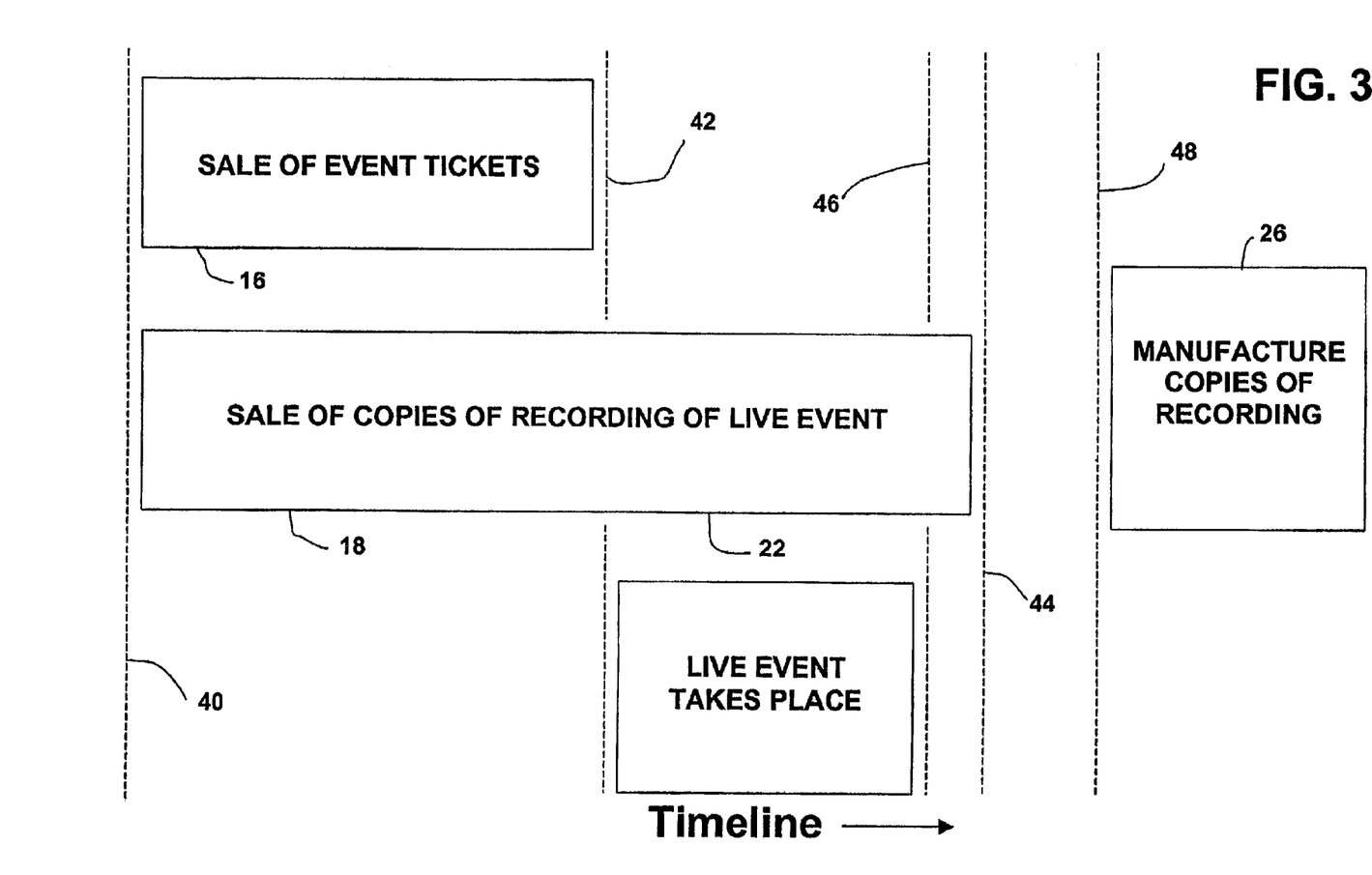
FIG. 3 is a diagram representing a timeline for an embodiment of the invention as shown in FIG. 1, wherein any copies of a recording of the live event must be purchased by prospective live event ticket purchasers before a specified cut-off date, which may be after the live event takes place.

In a variation of the method 10 of FIG. 1, the opportunity 18 to purchase copies of recordings extends beyond a date that the live event is conducted 22. This sequence is illustrated in FIG. 3, which is a timeline showing the sequence of events for this variation. As shown in FIG. 3, the opportunity 16 to purchase tickets to the live event and the opportunity 18 to purchase copies of a recording of the live event both begin at substantially the same time at an initial offering date 40. Preferably, the opportunity 16 to purchase tickets terminates at a ticket sale closing date 42, which is before the live event is conducted 22. However, in this variation, the opportunity 18 to purchase copies of recordings does not terminate until a specified "cut-off" date 44, which is after the date 46 that the live event 22 is concluded. A manufacturing date 48 occurs after the date 46 of the live event 22, and preferably after the specified "cut-off" date 44 for purchase copies of recordings 18. In this variation, the purchaser does not necessarily have to decide whether or not to purchase a copy of a recording of the live event at the point-of-sale 14 of tickets, and may make that decision all the way up to the specified "cut-off" date 44. In a case where a prospective purchaser elects to postpone the decision of whether to purchase a copy of a recording of the live event, whether or not a ticket has been purchased, a voucher or coupon is preferably obtained by the prospective purchaser from the point-of-sale 14, which gives the prospective purchaser information needed for ordering a copy before the specified "cut-off" date 44. Such information preferably includes the price for each copy, the destination to which payment should be forwarded, the types of payment accepted, and the specified "cut-off" date. Thus, when the purchaser elects to purchase copies of a recording before the "cut-off" date 44, he or she may follow the instructions provided on the voucher or coupon to order the copies.

Referring again to FIG. 1, once a desired number of copies has been manufactured 26, at least some of the copies manufactured are distributed 50 to those that pre-purchased them. This may be accomplished using the information about the purchaser (e.g., name, mailing address, shipping address, credit card or other payment information, number and types of copies ordered, etc.) obtained at the point-of-sale 14. If more copies are manufactured 26 that were pre-purchased 18, any extra copies may be distributed 52 in other channels of trade for sale or other dissemination.

As stated above, a desirable number of copies to be manufactured is calculated 28 based on a function of the determined number of pre-purchased copies 20. The determined number of pre-purchased copies 20 represents a number of automatic sales for which there is a substantially guaranteed return. This is one important benefit of the present invention, because it gives recording companies, artists and other rights holders a convenient mechanism for gauging a desirable number of copies of live event recordings to be produced, before the live event has been conducted and recorded and, more importantly, before expenses associated with manufacturing the copies have been incurred. Depending on market conditions, predicted popularity of a particular recording, etc., the calculated desirable number of copies to be manufactured 28 may equal or exceed the determined number of copies pre-purchased 20. In other words, the calculated desirable number of copies to be manufactured 28 may be represented by the function CDN=DNP+X, where CND is the calculated desirable number of copies to be manufactured 28, DNP is the determined number of copies pre-purchased 20, and X is the number of copies to be manufactured in addition to the DNP. For example, depending on the predicted popularity of a particular recording and other market conditions, using the function CDN=DNP+X, the CDN may be calculated as DNP+50,000, if it is believed that an additional 50,000 copies can be sold in channels of trade other than pre-purchasers. Thus, in a scenario where the calculated desirable number (CDN) of copies to be manufactured 28 exceeds the determined number of copies pre-purchased (DNP) 20, the determined number of copies pre-purchased 20 are distributed to those that pre-purchased them 50 and extra copies X are distributed 52 in other channels of trade for sale or other dissemination. The calculated desirable number of copies (CDN) to be manufactured 28 may be also be represented by the function CDN=(DNP)×(Y), where DNP is the determined number of copies pre-purchased 20 and Y is the percentage of DNP to be manufactured. Thus, using the function CDN=(DNP)×(Y), the CDN may be calculated as (DNP)×(125%), if it is believed that an additional 25% of the DNP can be sold in channels of trade other than pre-purchasers.

In any case, the manufactured copies for each release are preferably numbered (e.g., "Release No. 1, CD No. 5 of 1,523"). This provides several functions. One function is to provide useful information about the particular copy, e.g., the version of the release, if there is more than one version. Another function of such numbering is to emphasize that the copy is one of a "limited" or exclusive release (e.g., copy number 5 of 1,523), which may increase the perceived value of the copy as a "collectors item." Still another function is authentication, i.e., non-numbered copies are not "official" copies.

Again, as illustrated in FIG. 1, the opportunity 16 to purchase tickets to the live event and the opportunity 18 to purchase or "pre-purchase" copies of a recording of the live event both occur at the point-of-sale 14. Thus, the method 10 provides prospective live event ticket purchasers 12 with a convenient mechanism for pre-purchasing recordings of the live event before the event occurs (as shown in FIG. 2) or before another specified cut-off date (as shown in FIG. 3). Traditional points-of-sale of tickets for live events include the ticket box office, telephone ticket orders whereby a ticket purchase transaction takes place via telephone between an event ticket purchaser and a remote event ticket seller that sells tickets for the live event, mail order whereby a ticket purchase transaction takes place through the mail delivery system between an event ticket purchaser and a remote event ticket seller that sells tickets for the live event, and an electronic transaction over the Internet whereby an event ticket purchaser uses a user interface to access the Internet to purchase an event ticket from a remote event ticket seller. These traditional points-of-sale for live event tickets can also be employed in the present invention as points-of-sale 14 for the purchase or "pre-purchase" copies of a recording of the live event.

Figure 4:
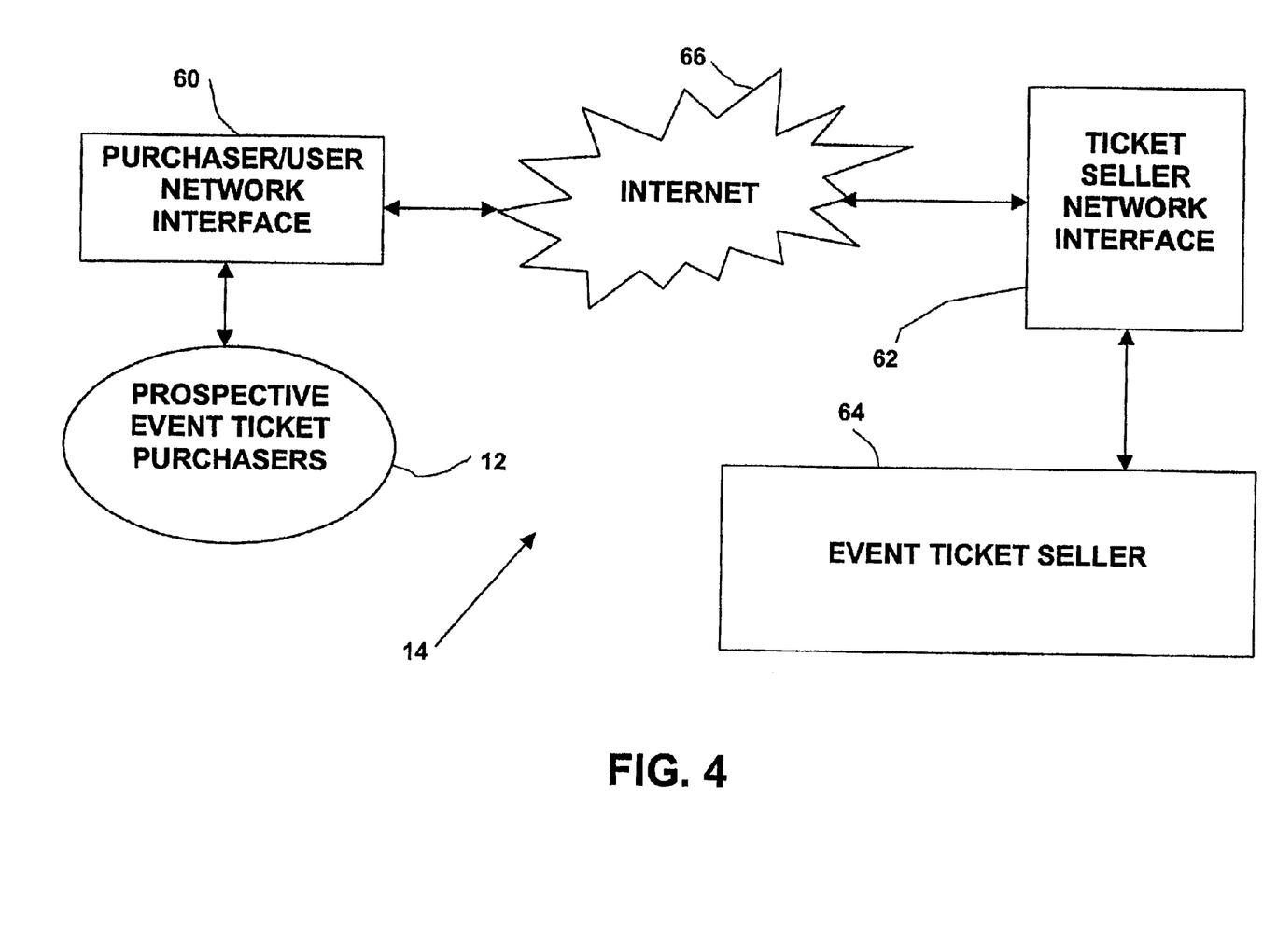
FIG. 4 is a schematic representation of an Internet-based point-of-sale for event tickets that may be employed in the practice of the present invention.

FIG. 4 is a schematic representation of an Internet-based system point-of-sale 14 for event tickets that may be employed for the purchase of event tickets 16 as well as for the purchase or "pre-purchase" copies of a recording of the live event 18. As shown in FIG. 4, prospective event ticket purchasers 12 utilize a computer network interface 60 (e.g., a personal computer with an Internet browser, a public kiosk with an Internet browser, etc.) to access a computer 62 hosted by an event ticket seller 64 via a computer network such as the Internet 66 in order to conduct an electronic transaction. The use of such a system for the purchase of event tickets 16 is well known in the art. The same system can be used as a point-of-sale 14 for the purchase or "pre-purchase" copies of a recording of the live event 18.

Regardless of the form of the point-of-sale 14, the prospective event ticket purchaser 12 is presented at the point-of-sale 14 with an opportunity to purchase event tickets 16 and/or an opportunity to purchase or "pre-purchase" copies of a recording of the live event 18. In cases where event ticket purchasers wish to purchase an event ticket as well as a copy of a recording of the live event, the cost of the copy is charged to the purchaser as an "add on" charge to the ticket price. The recording company, artist or other rights holder may elect to require that a ticket be purchased before providing the purchaser with the opportunity to purchase copies of a recording of the live event 18. However, the method of the invention may also be practiced in a manner whereby purchasers may elect to purchase copies of a recording of the live event 18 at the point-of-sale 14, even if they do not purchase a ticket for the event.

Figure 5:
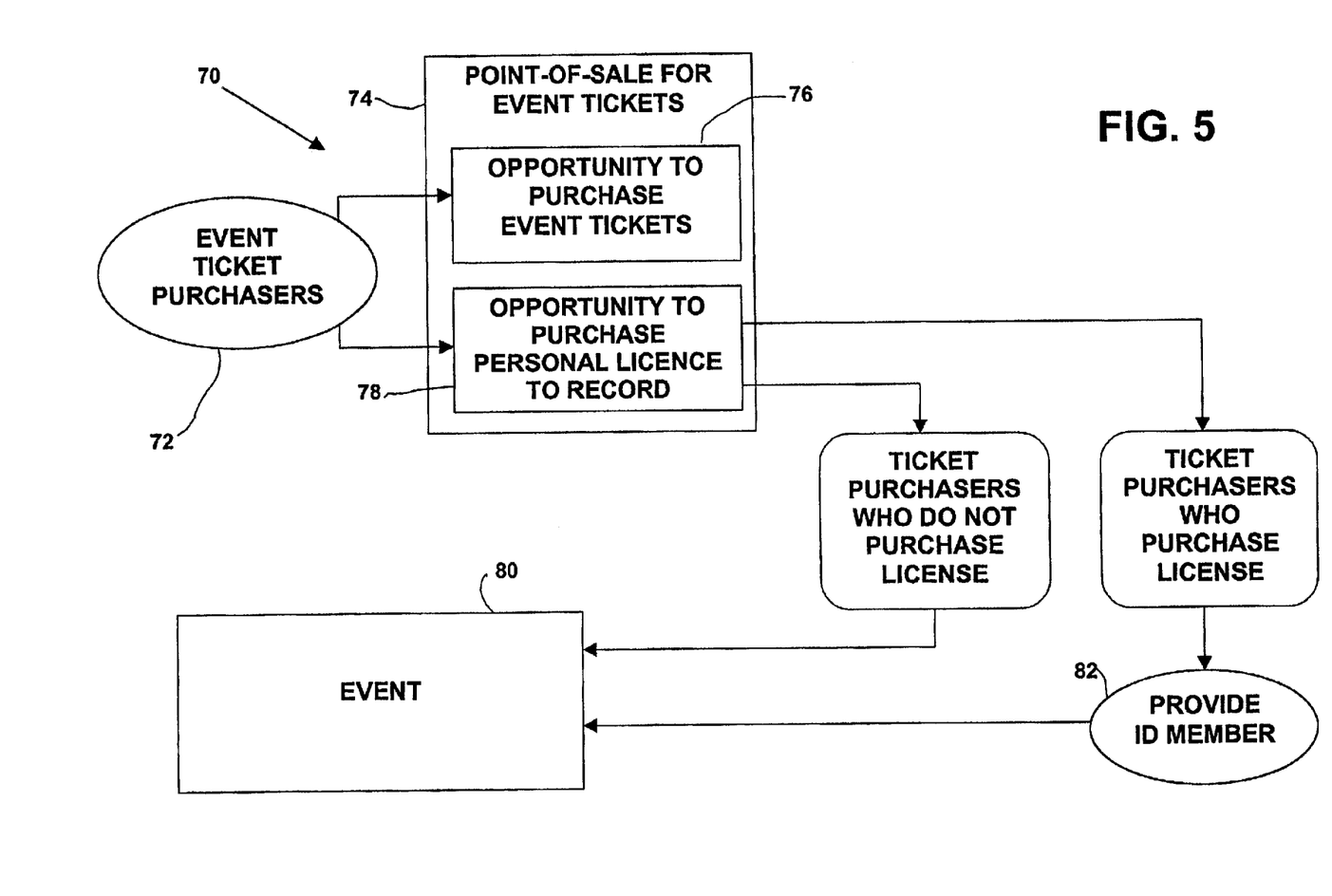
FIG. 5 is a schematic representation of another embodiment of the present invention, which permits prospective live event ticket purchasers to purchase a license to record the live event they will attend.

Another embodiment of a method of the present invention is shown schematically in FIG. 5 and represented generally by the reference numeral 70. In general, the method 70 of FIG. 5 permits prospective live event ticket purchasers 72 to purchase a license to record the live event they will attend. At the point-of-sale 74 of tickets for a live event, the prospective live event ticket purchasers 72 are given an opportunity 76 to purchase tickets to the live event, as is well known in the art. In addition, at the same point-of-sale 74 each prospective live event ticket purchaser 72 is also given an opportunity 78 to purchase a personal, non-exclusive license to make his or her own independent recording of the live event they will attend (e.g., by means of a personal audio/video recorder). The method 70 further comprises the step of conducting the live event 80.

Preferably, the method 70 illustrated in FIG. 5 further comprises the step of providing each license purchaser with an identifying member 82 that permits an event staff employee or other security officer to distinguish those event attendees that have purchased a license to record from those that have not purchased a license. Preferably, the identifying member 82 permits the event staff to visually identify licensed attendees and to distinguish them from non-licensed attendees. This is particularly important in situations where licensed attendees may be intermixed with non-licensed attendees in the same seating areas. For example, the identifying member 82 may be a tamper-proof wristband (i.e., one that cannot be removed without being damaged), an ink hand-stamp, or other substantially non-transferable device, that serves as a visual identification function. Alternatively, the identifying member 82 may be a transponder or other machine-readable device. In lieu of providing an identifying member, segregated seating sections may be delineated so that licensed attendees are separated from non-licensed attendees.

Figure 6:
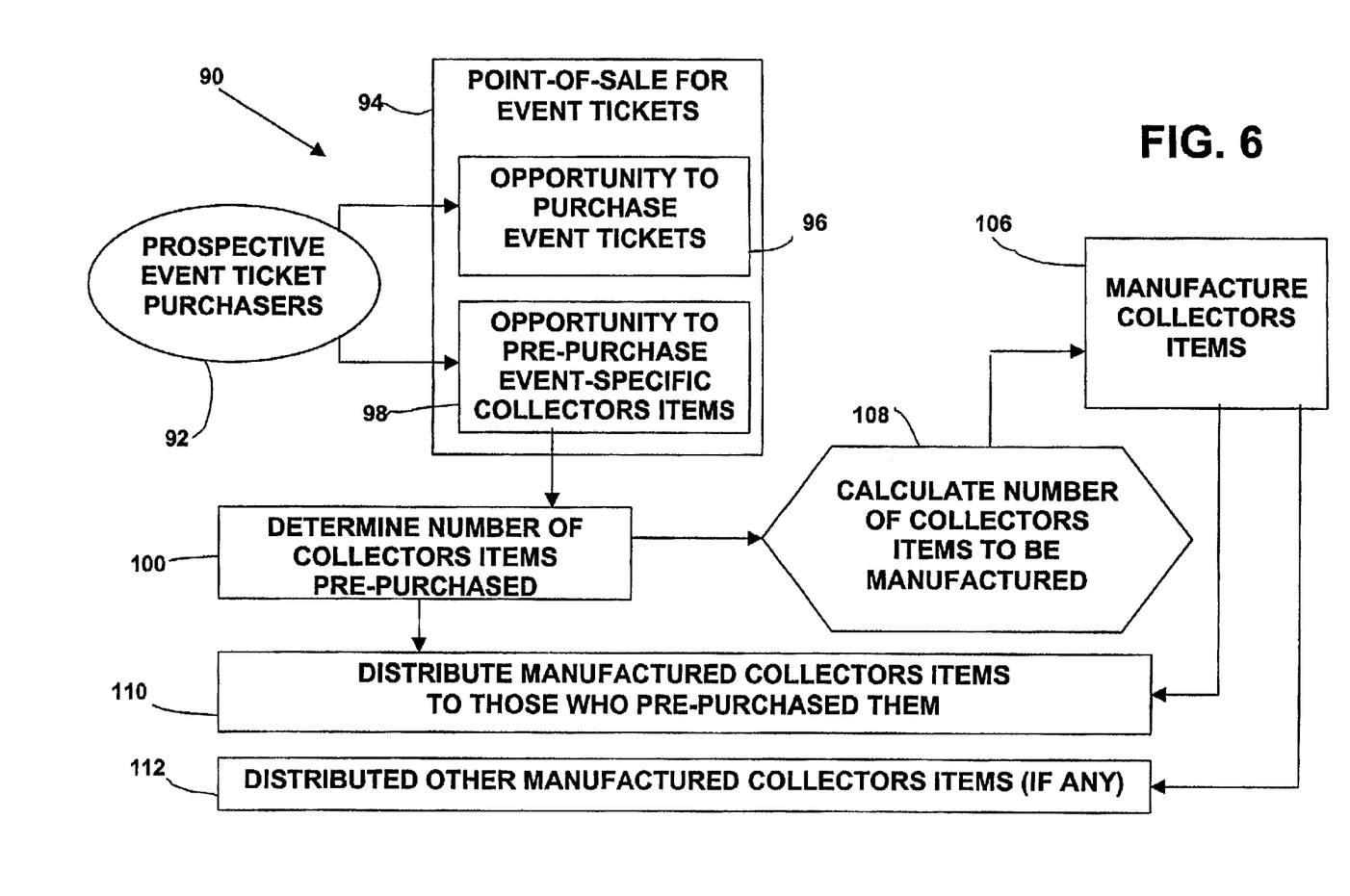
FIG. 6 is a schematic representation of a further embodiment of the present invention, which permits prospective live event ticket purchasers to pre-purchase event-specific collectors items relating to the live event they will attend.

To this point, the methods of the present invention have been described in reference to providing opportunities to purchase or make recordings of the live events. A further embodiment of a method of the present invention is shown schematically in FIG. 6 and represented generally by the reference numeral 90. In general, the method 90 of FIG. 6 permits prospective live event ticket purchasers 92 to pre-purchase event-specific "collectors items" relating to the live event they will attend. As shown in FIG. 6, at a point-of-sale 94 of tickets for a live event, prospective live event ticket purchasers 92 are given an opportunity 96 to purchase tickets to the live event, as is well known in the art. In addition, at the same point-of-sale 94 the prospective live event ticket purchasers 92 are given an opportunity 98 to pre-purchase "collectors items" pertaining to said live event, before the live event has been conducted (along a timeline similar to that shown in FIG. 2) or before some other specified cut-off date (along a timeline similar to that shown in FIG. 3). The point-of-sale 94 may comprise any of the various types of points-of-sale 14 that were described in connection with the method 10 shown in FIG. 1, including an Internet-based point-of-sale system of the type shown in FIG. 4.

It should be noted that the "collectors items" may be any articles pertaining to the live event. For example, the "collectors items" may comprise event-specific clothing (e.g., shirts, jackets, shorts, etc.), hats, pins, audio or video recordings (as described above in connection with the method 10 of FIG. 1), posters, novelty stickers, trading cards, sports memorabilia, books and jewelry. "Event-specific" merchandise refers to any merchandise bearing indicia, artwork, trade dress or other designs that are associated with the live event. For example, a T-shirt bearing the performer's name and the date and location of the event would be considered an event-specific article. This listing is merely exemplary, however, and other event-specific articles could be manufactured and sold in association with the method 90 without departing from the scope of the present invention.

With continued reference to FIG. 6, the method 90 further comprises the step of determining a number of event-specific collectors items pre-purchased 100 at the point-of-sale 94 of tickets for the live event. Apart from the obvious (i.e., counting the number and type of collectors items pre-purchased), the manner of determining the number of event-specific collectors items pre-purchased 100 will depend on the nature of the point-of-sale 94. In any case, however, the step of determining the number of event-specific collectors items pre-purchased 100 preferably includes the step of reviewing information about the purchaser (e.g., name, mailing address, shipping address, credit card or other payment information, number and types of copies ordered, etc.) obtained at the point-of-sale 94. The determined number of event-specific collectors items pre-purchased copies 100 represents a number of automatic sales for which there is a substantially guaranteed return. Again, this is an important benefit of the present invention, because it gives recording companies, artists and other rights holders a convenient mechanism for gauging a desirable number of event-specific collectors items to be produced, before the live event has been conducted and, more importantly, before expenses associated with manufacturing the merchandise have been incurred.

The method 90 illustrated in FIG. 6 further comprises the step of manufacturing a desired number of the event-specific collectors items 106. The step of manufacturing 106 may be subcontracted by the artists or other rights holder. A desirable number of event-specific collectors items to be manufactured is calculated 108 based on a function of the determined number of pre-purchased event-specific items 100. Depending on market conditions, predicted popularity of a particular collectors item, etc., the calculated desirable number of event-specific collectors items to be manufactured 108 may equal or exceed the determined number of event-specific collectors items pre-purchased 100. The calculated desirable number of event-specific collectors items to be manufactured 108 may be represented by the function CDN=DNP+X or by the function CDN=(DNP)×(Y), as described above in connection with the method 10 of FIG. 1, where CDN is the calculated desirable number of event-specific collectors items to be manufactured 108, DNP is the determined number of event-specific collectors items pre-purchased 100, X is the number of event-specific collectors items to be manufactured in addition to the DNP, and Y is the percentage of DNP to be manufactured. Thus, in a scenario where the calculated desirable number (CDN) of event-specific items to be manufactured 108 exceeds the determined number of event-specific items pre-purchased (DNP) 100, the determined number of event-specific items pre-purchased 100 are distributed to those that pre-purchased them 110 and any manufactured items over and above those pre-purchased are distributed 112 in other channels of trade for sale or other dissemination.

Thus, the method 90 provides prospective live event ticket purchasers 92 with a convenient mechanism for pre-purchasing event-specific collectors items and other merchandise pertaining to the live event before the event occurs or before another specified cut-off date (as shown in FIG. 3). In a case where a prospective purchaser elects to postpone the decision of whether to purchase an event-specific collectors items, whether or not a ticket has been purchased, a voucher or coupon may be obtained by the prospective purchaser from the point-of-sale 94, giving the prospective purchaser information needed for ordering event-specific items before the specified "cut-off" date. Such information preferably includes the price for each item, the destination to which payment should be forwarded, the types of payment accepted, and the specified "cut-off" date. Thus, when the purchaser elects to purchase event-specific collectors items before the "cutoff" date, he or she may follow the instructions provided on the voucher or coupon to order them.

Figure 7:
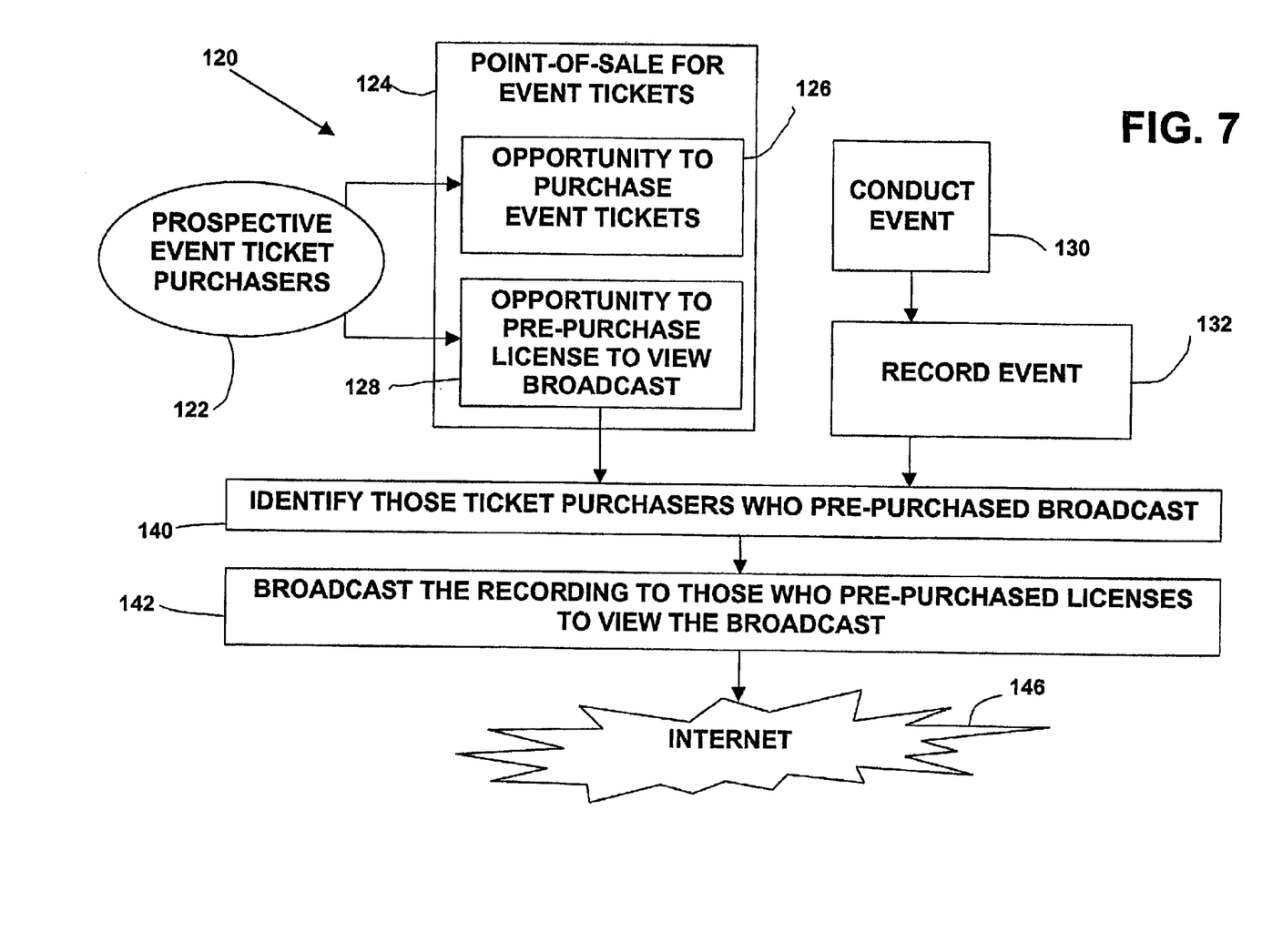
FIG. 7 is a schematic representation of still another embodiment of the present invention, which permits prospective live event ticket purchasers to pre-purchase a license to view a broadcast of the live event before the live event occurs.

Still another embodiment of a method of the present invention is shown schematically in FIG. 7 and represented generally by the reference numeral 120. In general, the method 120 of FIG. 7 permits prospective live event ticket purchasers 122 to pre-purchase a license to view a broadcast of the live event before the live event occurs. As shown in FIG. 7, at a point-of-sale 124 of tickets for a live event, prospective live event ticket purchasers 122 are given an opportunity 126 to purchase tickets to the live event, as is well known in the art. In addition, at the same point-of-sale 124 the prospective live event ticket purchasers 122 are given an opportunity 128 to pre-purchase a license to view a post-event broadcast of the live event, before the live event has been conducted (along a timeline similar to that shown in FIG. 2) or before some other specified cut-off date (along a timeline similar to that shown in FIG. 3). Again, the point-of-sale 124 may comprise any of the various types of points-of-sale 14 that were described in connection with the method 10 shown in FIG. 1, including an Internet-based point-of-sale system of the type shown in FIG. 4.

It should be noted that the "broadcast" may comprise a conventional broadcast via cable or satellite television systems pursuant to a "pay-per-view" style format, as is well known in the art, where only customers that have paid for the particular program are permitted to view an unencrypted broadcast. The "broadcast" may also comprise a digital broadcast over the Internet, which is viewable only by customers that have paid for the particular program. In addition, the "broadcast" may comprise a digital broadcast via HDTV or other similar technology, which is known and understood by those of skill in the art.

The method 120 illustrated in FIG. 7 also comprises the steps of conducting the live event 130 and recording at least a portion of the live event 132 being conducted. Again, the task of recording the live event is preferably performed by a professional recording company that has been retained for the job by the artist or other holder of rights. The method 120 further comprises the step of identifying those purchasers who pre-purchased a license to view the broadcast of the recording 140 from the point-of-sale 124 of tickets for the live event. The manner of identifying the licensed purchasers 140 will depend in part on the nature of the point-of-sale 124, but will necessarily include the step of processing information about the purchaser (e.g., name, address, location to which the broadcast is to be transmitted (e.g., street address or account number in the case of cable or satellite television broadcasts, Internet or e-mail address in the case of digital transmissions over the Internet, payment information, etc.) obtained at the point-of-sale 124. Finally, the method 120 comprises the step of broadcasting the recording 142 to those who pre-purchased licenses to view the broadcast. Again, the "broadcast" itself may comprise a conventional broadcast via cable or satellite television systems pursuant to a "pay-per-view" style format, a digital broadcast over the Internet 144, a digital broadcast via HDTV or other similar technology, or a broadcast pursuant to some other format or platform now existing (or not yet contemplated, but which will become apparent as technology continues to advance) without departing from the scope of the present invention.

Various changes and modifications to the preferred embodiments as explained herein would be envisioned by those of skill in the art. While the present invention has been described by reference to specific embodiments and specific uses, it should be understood that other embodiments and arrangements could be devised, and different uses could be made, without departing from the scope of the invention as set forth in the following claims.

What is claimed is:

1. A method comprising the steps of:
   providing, at a point-of-sale of tickets for a live performance event before said live performance event occurs, an opportunity for prospective event ticket purchasers to pre-purchase one or more copies of a recording of at least a portion of said live performance event;
   conducting said live performance event;
   recording at least a portion of said live performance event;
   manufacturing a desirable number of copies of said recording; and
   distributing at least some of the manufactured copies of said recording to those that pre-purchased them.

2. The method of claim 1 wherein said live performance event comprises at least one of a live musical performance, a live choreographic performance, a live dramatic performance, a live oration and a live sporting event.

3. The method of claim 1 wherein said point-of-sale of tickets for said live performance event comprises at least one of a ticket box office that sells tickets for said live performance event, a telephone system adapted to permit a transaction over the telephone between a prospective event ticket purchaser and a remote prospective event ticket seller that sells tickets for said live performance event, a mail delivery system adapted to permit a transaction to take place by mail between a prospective event ticket purchaser and a remote prospective event ticket seller that sells tickets for said live performance event, and a user interface connected to a computer network and adapted to permit an electronic transaction to take place via said computer network between a remote prospective event ticket purchaser and a remote prospective event ticket seller that sells tickets for said live performance event.

4. The method of claim 1 wherein said recording comprises at least one of an audio recording, a video recording and a transcript.

5. The method of claim 1 wherein said copies comprise at least one of phonograph records, audio cassettes, compact discs, mini-discs, digital audio tapes, video cassettes, DVDs, downloadable digital files, electronic documents and printed documents.

6. The method of claim 1 further comprising the steps of:
   determining a number of copies of said recording pre-purchased at said point-of-sale of tickets for said live performance event; and
   calculating the desirable number of copies of said recording to be manufactured.

7. The method of claim 6 wherein the step of calculating a desirable number of copies of said recording to be manufactured includes calculating said desirable number of copies based on a function of the determined number of copies of said recording pre-purchased at said point-of-sale of tickets for said live performance event.

8. The method of claim 7 wherein said desirable number of copies is at least as large as a number of copies of said recording pre-purchased at said point-of-sale of tickets for said live performance event.

9. The method of claim 1 wherein the step of providing an opportunity for purchasers to pre-purchase copies includes providing the purchasers with an option to pre-purchase one or more copies at the ticket box office that sells tickets for said live performance event before said live performance event occurs.

10. The method of claim 1 wherein the step of providing an opportunity for purchasers to pre-purchase copies includes providing a telephone system adapted to permit a transaction over the telephone between a prospective event ticket purchaser and a remote prospective event ticket seller that sells tickets for said live performance event before said live performance event occurs.

11. The method of claim 1 wherein the step of providing an opportunity for purchasers to pre-purchase copies inoludes providing a mail delivery system adapted to permit a transaction to take place by mail between a prospective event ticket purchaser and a remote prospective event ticket seller that sells tickets for said live performance event before said live performance event occurs.

12. The method of claim 1 wherein the step of providing an opportunity for purchasers to pre-purchase copies includes providing a user interface for a computer network adapted to permit an electronic transaction to take place via said computer network, before said live performance event occurs, between remote prospective event ticket purchasers and a remote prospective event ticket seller that sells tickets for said live performance event before said live performance event occurs.

13. The method of claim 1 wherein the step of providing an opportunity for purchasers to pre-purchase copies of a recording of at least a portion of said live performance event requires the purchasers to purchase a ticket for said live performance event.

14. A method comprising the steps of:
providing, at a point-of-sale of tickets for a live performance event before said live performance event occurs, an opportunity for prospective event ticket purchasers to purchase one or more copies of a recording of said live performance event before a specified cut-off date;
conducting said live performance event;
recording said live performance event;
manufacturing a desirable number of copies of said recording; and
distributing at least some of the manufactured copies of said recording to those that purchased them before said specified cut-off date.

15. The method of claim 14 wherein the specified cut-off date occurs after the live performance event has occurred.

16. The method of claim 14 wherein said live performance event comprises at least one of a live musical performance, a live choreographic performance, a live dramatic performance, a live oration and a live sporting event.

17. The method of claim 14 wherein said point-of-sale of tickets for said live performance event comprises at least one of a ticket box office that sells tickets for said live performance event, a telephone system adapted to permit a transaction over the telephone between a prospective event ticket purchaser and a remote prospective event ticket seller that sells tickets for said live performance event, a mail delivery system adapted to permit a transaction to take place by mail between a prospective event ticket purchaser and a remote prospective event ticket seller that sells tickets for said live performance event, and a user interface connected to a computer network and adapted to permit an electronic transaction to take place via said computer network between a remote prospective event ticket purchaser and a remote prospective event ticket seller that sells tickets for said live performance event.

18. The method of claim 14 wherein said copies comprise at least one of phonograph records, audio cassettes, compact discs, mini-discs, digital audio tapes, video cassettes, DVDs, downloadable digital files, electronic documents and printed documents.

19. The method of claim 14 wherein the step of providing an opportunity for purchasers to purchase one or more copies before a specified cut-off date includes giving the purchasers information regarding the price for each of said copies and the destination to which payment should be forwarded before said specified cut-off date.

20. The method of claim 14 further comprising the steps of:
determining a number of copies of said recording purchased before said specified cut-off date; and
calculating the desirable number of copies of said recording to be manufactured based on a function of the determined number of copies of said recording purchased before said specified cut-off date.

21. A method comprising the steps of:
providing, at a point-of-sale of tickets for a live performance event, before said line performance event occurs an opportunity for attendees of the live performance event to purchase one or more copies of a recording of said live performance event;
conducting said live performance event;
recording at least a portion of said live performance event;
manufacturing copies of said recording; and
distributing at least some of the copies of said recording to attendees of the live performance event that purchase them.

22. The method of claim 21 wherein the step of manufacturing copies of said recording occurs on site at the venue.

23. The method of claim 22 wherein the step of distributing at least some of the copies of said recording to attendees of the live performance event that purchase them occurs before the purchasing attendees exit the venue.

24. The method of claim 21 wherein the step of providing an opportunity for attendees of the live performance event to purchase one or more copies of a recording of said live performance event is performed at least in part after the live performance event has started.

25. The method of claim 21 wherein the step of providing an opportunity for attendees of the live performance event to purchase one or more copies of a recording of said live performance event is performed at least in part after the live performance event is concluded.

26. The method of claim 21 wherein the step of manufacturing copies of said recording includes copying said recording to compact discs, wherein each compact disc contains at least one copy of said recording.

27. The method of claim 21 wherein the step of manufacturing copies of said recording includes copying said recording to a computer, said computer being connected to a global computer network, and wherein the step of distributing copies of said recording includes distributing electronic copies by broadcasting the recording over the global computer network for post-event viewing by attendees of the live performance event that purchase a right to view said broadcast.

28. The method of claim 21 further comprising the steps of:
determining a number of copies of said recording purchased by attendees of the live performance event; and
calculating a desirable number of copies of said recording to be manufactured based on a function of the determined number of copies of said recording purchased by attendees of the live performance event;
wherein the step of manufacturing copies of said recording includes manufacturing said desirable number of copies.

29. The method of claim 21 wherein the step of manufacturing copies of said recording occurs on site at the venue, the step of distributing at least some of the copies of said recording to attendees of the live performance event that purchase them occurs before the purchasing attendees exit the venue, the step of providing an opportunity for attendees of the live performance event to purchase one or more copies of a recording of said live performance event is performed at least in part after the live performance event is concluded, and the step of manufacturing copies of said recording includes copying said recording to compact discs, wherein each compact disc contains at least one copy of said recording.

30. The method of claim 21 wherein said point-of-sale of tickets for the live pefformance event is located at the venue where the live performance is performed.

* * * * *

UNITED STATES PATENT AND TRADEMARK OFFICE
CERTIFICATE OF CORRECTION

PATENT NO.       : 6,920,428 B2
APPLICATION NO.  : 09/992811
DATED            : July 19, 2005
INVENTOR(S)      : Shawn Buchanan Greene Page 1 of 1

It is certified that error appears in the above-identified patent and that said Letters Patent is hereby corrected as shown below:

In column 13, line 7, in claim 11, delete "inoludes" and insert -- includes --, therefor.

In column 14, line 16, in claim 21, after "event" delete ",".

In column 14, line 16, in claim 21, delete "line" and insert -- live --, therefor.

In column 14, line 16, in claim 21, after "occurs" insert -- , --.

In column 16, line 6, in claim 30, delete "pefformance" and insert -- performance --, therefor.

Signed and Sealed this
Fifteenth Day of November, 2011

David J. Kappos
*Director of the United States Patent and Trademark Office*